United States Patent [19]

Baba et al.

[11] 4,095,666

[45] Jun. 20, 1978

[54] APPARATUS FOR PREVENTING COLLISION OF VEHICLES

[75] Inventors: Kousaku Baba, Yokosuka; Kazuhiro Ban, Amagasaki, both of Japan

[73] Assignees: Mitsubishi Denki Kabushiki Kaisha, Tokyo; Nissan Motor Company, Limited, both of Japan

[21] Appl. No.: 783,002

[22] Filed: Mar. 30, 1977

[30] Foreign Application Priority Data

Apr. 2, 1976 Japan ................... 51-36741

[51] Int. Cl.² ............. B60K 27/00; B60K 33/00
[52] U.S. Cl. ..................... 180/98; 303/100; 340/53; 343/7 VM
[58] Field of Search .............. 180/98, 105 E; 246/182 B, 187 B, 187 C; 303/91, 97, 100, 108; 340/53, 62; 343/7 VM

[56] References Cited

U.S. PATENT DOCUMENTS

| | | | |
|---|---|---|---|
| 2,851,120 | 9/1958 | Fogiel | 180/98 |
| 3,420,572 | 1/1969 | Bisland | 180/98 X |
| 3,689,882 | 9/1972 | Dessailly | 343/7 VM X |
| 3,820,622 | 6/1974 | Powell | 180/98 |

FOREIGN PATENT DOCUMENTS 2,319,498  10/1973  Germany ............... 246/182 B

Primary Examiner—Stephen G. Kunin
Attorney, Agent, or Firm—Oblon, Fisher, Spivak, McClelland & Maier

[57] ABSTRACT

An apparatus for preventing collision of a vehicle comprises
a device for measuring a distance R from a driving vehicle to an obstacle and a relative velocity V of the driving vehicle to said obstacle;
a circuit for generating a damping signal when the relation of the distance R, the relative velocity V and a preset deceleration $\alpha$ becomes the relation of $R < V^2/2\alpha$;
a deceleration detector for detecting the actual deceleration $\alpha'$ of the driving vehicle;
a correction circuit which compares the actual deceleration $\alpha'$ detected by the deceleration detector with the preset deceleration $\alpha$ and the damping signal is corrected depending upon the comparative data.

5 Claims, 4 Drawing Figures

APPARATUS FOR PREVENTING COLLISION OF VEHICLES

BACKGROUND OF THE INVENTION

The present invention relates to an apparatus for preventing collision of a vehicle which imparts a damping of a driving vehicle according to a preset deceleration without being affected by a condition of contact between a surface of road or railway and wheels of the vehicle.

Heretofore, it has been known to provide an apparatus for preventing collision of a vehicle by damping the vehicle by measuring a distance R from the driving vehicle to an obstacle such as a forward vehicle or a stopping vehicle and a relative velocity V thereof and damping the driving vehicle by generating a damping signal when the relation of $$R - R_0 < (V^2/2\alpha)$$

wherein $R_0$ represents the nearest distance and $\alpha$ represents a preset deceleration, is given.

The damping apparatus has been employed for preventing the collision of vehicles. Referring to FIG. 1, the known damping apparatus will be illustrated in detail.

In FIG. 1, the distance R from the vehicle to the obstacle is plotted on the abscissa and the relative velocity V is plotted on the ordinate.

The driving vehicle approaching to the obstacle at a relative velocity of $V = V_1 =$ constant can be shown as the line 11. When the curve 12 is shown by $R - R_0 = V^2/2\alpha$, the curve 12 crosses the line 11 at the distance of $R_1 - R_0 = V_1^2/2\alpha$. The cross point is given as A. The driving vehicle approaching at a constant velocity $V_1$ is controlled with a constant damping by the damping signal for the preset deceleration $\alpha$ at the cross point A.

Thus, if the actual deceleration $\alpha'$ of the vehicle has resulted because of the effect of friction between the wheels (tires) and a surface of road, the vehicle gradually approaches the shortest distance $R_0$ to the obstacle along the deceleration curve 12 in the case of $\alpha = \alpha'$, whereby the relative velocity of the driving vehicle becomes zero in the shortest distance $R_0$ and the driving vehicle avoids collision with the obstacle.

Thus, even though the damping is generated by the preset deceleration $\alpha$, it is rare that $\alpha$ precisely equals $\alpha'$ because of the effect of friction between the surface of road and the wheels.

One way to overcome this problem is to determine the deceleration $\alpha$ after considering the effect of the friction between the surface of the road and the wheels. However, the effect of friction are not easily determined because of the number of variables involved.

In the case of $\alpha' > \alpha$, excess damping is applied and the curve 13 from the point A in FIG. 1, and the relation of $R - R_0 > V^2/2\alpha$ is given at a certain point on the curve 13 to release the damping signal whereby the driving vehicle drives at a constant velocity toward the point C on the curve 12.

Thus, the damping is also applied at the point C and the excess damping phenomenon is repeated at the points D and E. The intermittent dampings are applied and a smooth damping can not be attained.

The intermittent damping is applied because of the delay of the mechanical system of the damping apparatus from the time of the generation of the damping signal to the actual performance of the damping operation.

In the case of $\alpha' < \alpha$, the driving vehicle has the velocity $V_2$ even in the nearest distance $R_0$ as shown by the curve 14 in FIG. 1. Therefore, when $\alpha' < \alpha$ there is a possibility of a rear-end collision with the forward obstacle (vehicle, etc.) which is quite a dangerous condition.

SUMMARY OF THE INVENTION

It is an object of the present invention to provide an apparatus which prevents collision of a vehicle without intermittent damping operation.

Another object of the present invention is to provide an apparatus which prevents collision of a vehicle by controlling the velocity of the vehicle without being affected by frictional effects between the wheels and the surface of road.

The foregoing and other objects of the present invention have been attained by providing an apparatus for preventing collision of a vehicle which comprises a device for measuring a distance R from a driving vehicle to an obstacle and a relative velocity V of said driving vehicle to said obstacle; a circuit for generating a damping signal when the relation of the distance R, the relative velocity V and a preset deceleration $\alpha$ becomes the relation of $R < V^2/2\alpha$; a deceleration detector for detecting the actual deceleration $\alpha'$ of the driving vehicle; a correction circuit which compares the actual deceleration $\alpha'$ detected by the deceleration detector with the preset deceleration $\alpha$ and generates a corrected damping signal in accordance with the comparative data.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings in which.

DESCRIPTION OF THE PREFERRED EMBODIMENTS

A preferred embodiment of the novel apparatus for vehicle collision prevention according to the present invention will be described in detail by referring to FIG. 2.

Figure 1:
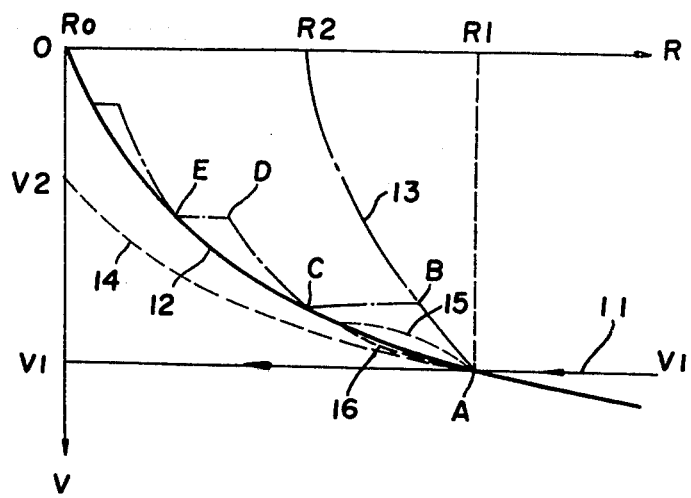
FIG. 1 is a graph of characteristic curves showing the principles of the conventional apparatus and the apparatus of the present invention.
Figure 2:
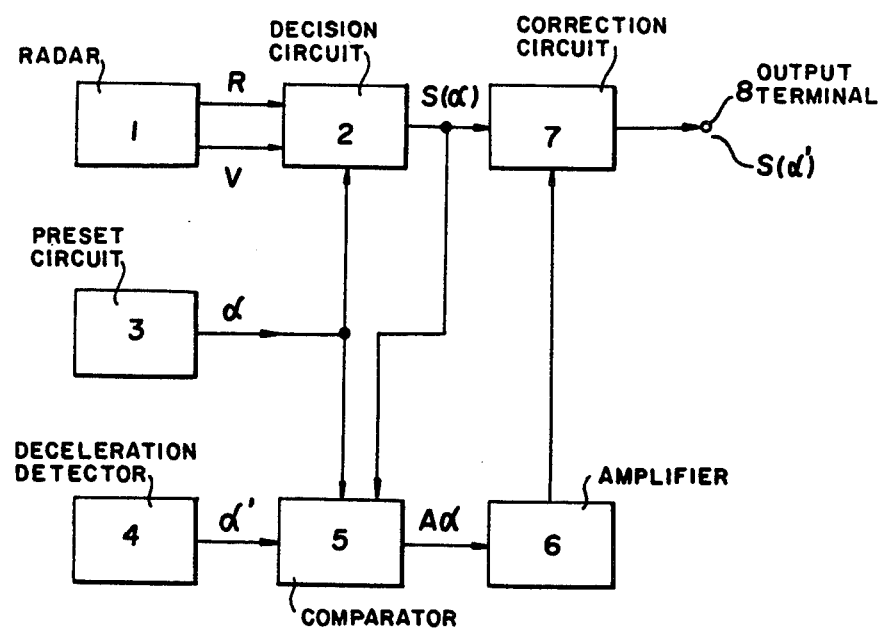
FIG. 2 is a block diagram of the apparatus of the present invention.

The principle of the present invention will be also described by referring to FIG. 1 in the description of the embodiment of FIG. 2.

In FIG. 2, the reference numeral 1 designates a radar for measuring the distance R from the driving vehicle to the obstacle and the relative velocity V; 2 designates a decision circuit for determining whether the distance R is more or less than the value of $V^2/2\alpha$ and for generating a damping signal $S(\alpha)$ corresponding to the deceleration $\alpha$ when the dangerous condition determined the relationships of the preset deceleration α, the distance R and the velocity V exists.

The reference numeral 3 designates a preset circuit for the preset deceleration α; 4 designates a deceleration detector for detecting the actual deceleration α' or a circuit for calculating the deceleration as the differential of the velocity of the driving vehicle; 5 designates a comparing circuit for detecting a difference $\Delta \alpha = \alpha - \alpha'$ wherein α designates the preset deceleration and α' designates the actual deceleration 6 designates an amplifier for amplifying the difference $\Delta \alpha$; 7 designates a correction circuit for correcting the output of the decision circuit 2 in response to the output signal of the amplifier 6; and 8 designates an output terminal for the damping signal.

The operation of the embodiment of the apparatus of the present invention will be described by referring to FIG. 1 showing the principle of the invention.

As discussed above for the conventional apparatus, the driving vehicle is approaching an obstacle at a constant relative velocity $V_1$ as it moves from right to left on the line 11 of FIG. 1.

When the driving vehicle approaches the obstacle at the distance $R_1$ that is the point A of FIG. 1, the decision circuit 2 generates the damping signal $S(\alpha)$ corresponding to the deceleration α as that of the conventional apparatus.

In the correction circuit 7, the damping signal $S(\alpha')$ = $S(\alpha)$ generated is fed to the damping system from output terminal 8 without an acceleration correction factor until the deceleration α' is actually given to the driving vehicle.

Accordingly, in the initial condition of the damping operation, the damping is applied by the damping signal $S(\alpha)$ given depending upon the preset deceleration α (the damping signal being the same as that of the conventional apparatus).

Then the apparatus of the invention umplements a damping technique differents than that of the conventional apparatus.

When damping is actually applied by the damping signal $S(\alpha)$, the deceleration detector 4 detects the actual deceleration α' of the driving vehicle. When the actual deceleration α' is detected by the deceleration detector 4, the difference $\Delta \alpha = \alpha - \alpha'$ between α' and the preset deceleration α is immediately detected by the comparing circuit 5. The comparing circuit 5 generates the signal $\Delta \alpha = 0$. The actual deceleration α' is not detected by the deceleration detector 4 during the time the damping signal $S(\alpha)$ corresponding to the preset deceleration α is generated by the decision circuit 2 until a constant time given by the response speed of the mechanical system.

The difference $\Delta \alpha$ given by the comparing circuit 5 is amplified by the amplifier 6 and is fed to the correction circuit 7. Correction Circuits 7 converts the damping signal $S(\alpha)$ into the corrected damping signal $S(\alpha')$, and thereby imparts the actual deceleration.

Referring to FIG. 1, in the case of α' > α, the driving vehicle has the velocity along the curve 13 from the point A, however, it changes along the curve 15 when the actual deceleration α' is detected by the deceleration detector 4 and it gradually reaches to the curve 12.

In the case of α' < α, the driving vehicle has the velocity along the curve 14 from the point A, however, it changes along the curve 16 and gradually reaches to the curve 12.

It is possible for the driving vehicle to reach the predetermined deceleration curve within a time shorter than that of the conventional apparatus, by use of the above-mentioned damping correction. Accordingly, it is possible to attain the smooth damping having short damping time without intermittent damping as in the conventional apparatus.

The result of the invention can be understood by the principle shown in FIG. 1 and the embodiment of FIG. 2.

Figure 3:
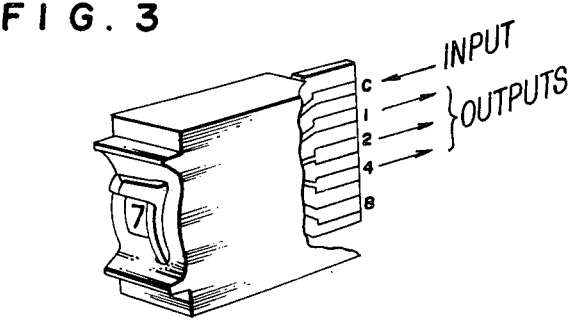
FIG. 3 is a view of an acceleration $\alpha$ presetting device.

The preset circuit 3 for the preset deceleration α will be further illustrated referring to FIG. 3.

When the deceleration α is digitally preset, a digital switch shown in FIG. 3 can be used.

The output of the digital switch can be as follows.

Binary Coded Decimal L11-02A; L10-02A; L20-02A; T11-02A; T10-02A; T20-02A.

| Dial Position | Symbol | Terminal of COM is connected to output terminals shown as • | | | |
|---|---|---|---|---|---|
| | | 1 | 2 | 4 | 8 |
| 0 | 0 | | | | |
| 1 | 1 | • | | | |
| 2 | 2 | | • | | |
| 3 | 3 | • | • | | |
| 4 | 4 | | | • | |
| 5 | 5 | • | | • | |
| 6 | 6 | | • | • | |
| 7 | 7 | • | • | • | |
| 8 | 8 | | | | • |
| 9 | 9 | • | | | • |

Figure 4:
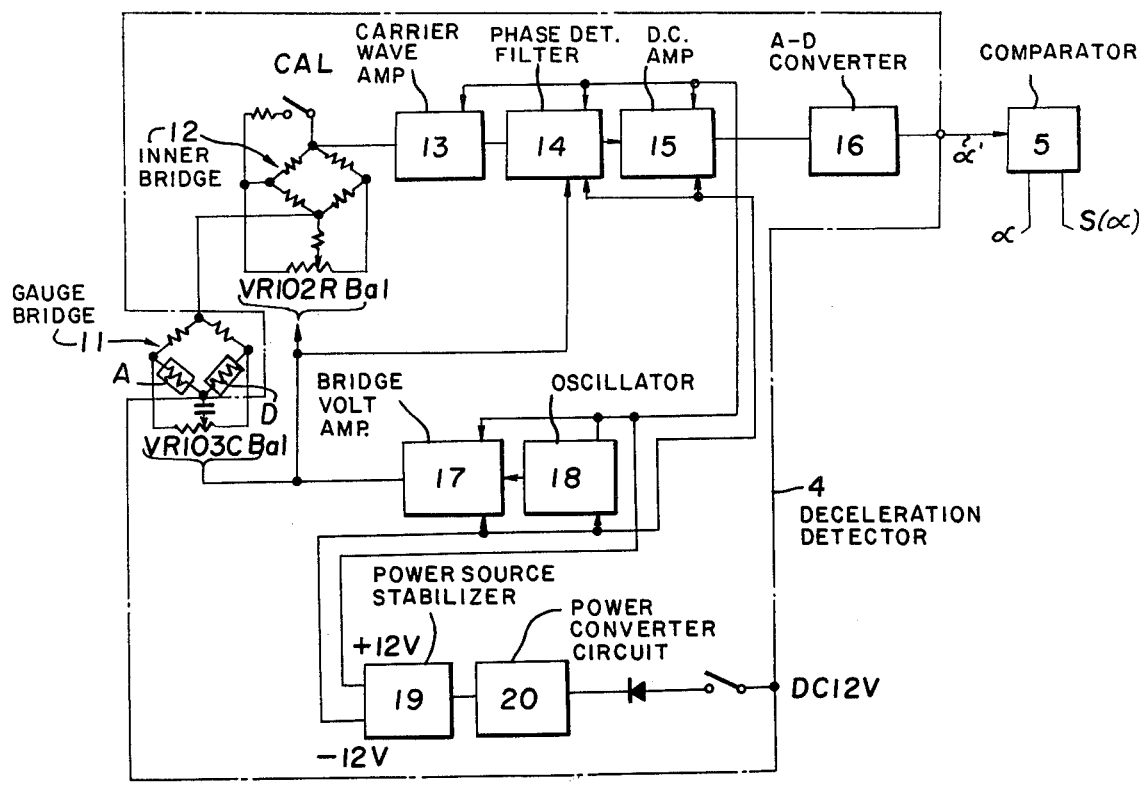
FIG. 4 is a block diagram of the deceleration detector 4 shown in FIG. 1.

The deceleration detector 4 for detecting the actual deceleration α' will be further illustrated referring to FIG. 4.

The deceleration detector 4 includes a strain tester having a strain gauge at one line of a wheatstone bridge and an A-D converter for converting the output of the tester to digital signal.

One embodiment of the circuit of the decelerator detector 4 is shown in FIG. 4.

In FIG. 4, the reference numeral 11 designates a gauge bridge; 12 designates an inner bridge; 13 designates a carrier wave amplifying circuit; 14 designates a phase detecting filter circuit; 15 designates a DC amplifying circuit; 16 designates an A-D converter; 17 designates a bridge voltage amplifying circuit; 18 designates an oscillating circuit; 19 designate ±12V stabilizing power source circuit; and 20 designates a converter circuit.

In the gauge 11 bridge, A gage designates an active gage and D gate designates a dummy gauge (temperature compensation) which is kept equivalent to the A gauge so as to prevent strain.

The AC voltage of the amplified oscillation circuit 18 is applied to the bridges 11 and 12. The equilibration of the resistance and the capacitance of the bridges 11 and 12; is held by a varistors VR102 and VR103.

When the strain is given to the A gauge, the AC voltage of the oscillation circuit 18 modulated depending upon the strain and is output from the bridge 11. The output voltage is amplified in a carrier wave amplifying circuit 13 and the positive or negative modulation of the strain is discriminated by the phase detecting circuit 14, and the signal is also filtered in phase detecting filter circuit 14 to convert the waveform to a corresponding electric signal. The electric signal is amplified by DC amplification circuit 15 and the signal is measured by an oscillograph or the other recorder.

The output waveform of the bridge is converted to the digital signal by the A-D converter 16 so as to detect the actual deceleration $\alpha'$.

As described above, in accordance with the invention, the collision of the vehicle can be prevented by the smooth damping without being affected by the conditions of the surface of road and railway, the condition of wheels and the condition of friction and contact of the wheels to the surface of road depending upon the weather.

Moreover, the complicated effects in the above-mentioned condition can be transitionally overcome by the automatic correction depending upon the variation of the conditions of the surface of road, wheels, etc., and the response of the mechanical system.

What is claimed is:

1. An apparatus for preventing collision of a vehicle comprising:
    a device for measuring a distance R from a driving vehicle to an obstacle and a relative velocity V of said driving vehicle to said obstacle;
    a circuit for generating a damping signal when the relation of said distance R, said relative velocity V and a preset deceleration $\alpha$ becomes the relation of $R < V^2/2\alpha$;
    a deceleration detector for detecting the actual deceleration $\alpha'$ of said driving vehicle, said deceleration detector including oscillator circuit means for generating an unmodulated carrier wave, strain gauge bridge means connected to said oscillator circuit means for modulating said carrier wave in accordance with said actual deceleration $\alpha'$, and demodulating circuit means connected to said strain gauge bridge means for demodulating said modulated carrier wave and generating a signal proportional to said actual deceleration $\alpha'$; and a correction circuit for comparing the actual deceleration $\alpha'$ detected by said deceleration detector with the present deceleration $\alpha$ and correcting the damping signal depending upon the comparative data.

2. An apparatus for preventing collision of a vehicle according to claim 1, wherein said device for measuring the distance and the relative velocity is a radar device.

3. An apparatus for preventing collision of a vehicle according to claim 1, wherein said deceleration detector comprises a circuit for calculating said actual deceleration $\alpha'$ from a velocity signal of said driving vehicle.

4. An apparatus for preventing collision of a vehicle according to claim 1 wherein the actual deceleration $\alpha'$ is calculated by taking the differential of a velocity signal of said driving vehicle.

5. An apparatus for preventing collision of a vehicle according to claim 3 wherein the actual deceleration $\alpha'$ is calculated by taking the differential of a velocity signal of said driving vehicle.

* * * * *